United States Patent
Franzoso et al.

(10) Patent No.: US 6,181,466 B1
(45) Date of Patent: Jan. 30, 2001

(54) UNEQUAL COUPLERS FOR MULTIMODE PUMPING OPTICAL AMPLIFIERS

(75) Inventors: Federico Franzoso, Loreo; Aurelio Pianciola, Pavia, both of (IT)

(73) Assignee: Pirelle Cavi e Sistemi S.p.A., Milan (IT)

( * ) Notice: Under 35 U.S.C. 154(b), the term of this patent shall be extended for 0 days.

(21) Appl. No.: 09/138,361

(22) Filed: Aug. 21, 1998

Related U.S. Application Data

(60) Provisional application No. 60/057,671, filed on Sep. 5, 1997.

(30) Foreign Application Priority Data

Aug. 23, 1997 (EP) .................................. 97114620

(51) Int. Cl.$^7$ ................. H01S 3/00; G02B 6/26
(52) U.S. Cl. ................. 359/341; 385/43; 385/96
(58) Field of Search ................. 359/341, 345; 385/96, 43

(56) References Cited

U.S. PATENT DOCUMENTS

| | | |
|---|---|---|
| 5,170,458 | 12/1992 | Aoyagi et al. . |
| 5,185,814 | 2/1993 | Healey . |
| 5,295,211 * | 3/1994 | Weidman ........................ 385/43 |
| 5,329,600 * | 7/1994 | Sasaoka et al. ................ 385/43 |
| 5,408,555 * | 4/1995 | Fielding et al. ............... 385/43 |
| 5,506,723 * | 4/1996 | Junginger ..................... 359/341 |
| 5,533,163 | 7/1996 | Muendel . |
| 6,016,218 * | 1/2000 | Jo et al. ....................... 359/341 |

FOREIGN PATENT DOCUMENTS

| | | |
|---|---|---|
| 0 459 685 | 12/1991 | (EP) . |
| 0 556 973 | 8/1993 | (EP) . |
| WO 93/15536 | 8/1993 | (WO) . |
| WO 95/10868 | 4/1995 | (WO) . |
| WO 96/20519 | 7/1996 | (WO) . |

OTHER PUBLICATIONS

Y. Takeuchi, "Characteristics analysis of wavelength–division–multiplexing fiber couplers fabricated with a microheater", Applied Optics, vol. 35, No. 9, pp. 1478–1484, Mar. 20, 1996.

* cited by examiner

Primary Examiner—Mark Hellner
(74) Attorney, Agent, or Firm—Finnegan, Henderson, Farabow, Garrett & Dunner, L.L.P.

(57) ABSTRACT

A twin coupler system includes first and second optical couplers that couple a multimode pump fiber into a double-clad active primary fiber. The pump fiber carries multimode pump power from a multimode source. The primary fiber, on the other hand, carries optical information signals on the single mode core that are amplified through the pump power. A system and method for manufacturing the twin coupler system constructs the first coupler by preparing first portions of the primary and pump fibers for coupling and performing fusion and tapering operations on the primary and pump fibers at the first portions, and constructs the second coupler by preparing second portions of the primary and pump fibers for coupling and performing fusion and tapering operations on the primary and pump fibers at the second portions. The fusion and tapering operations at the second portions are dependent upon the fusion and tapering operations performed at the first portions so as to achieve a maximum coupling efficiency of the pump power from the pump fiber to the primary fiber for the entire twin coupler system.

20 Claims, 14 Drawing Sheets

UNEQUAL COUPLERS FOR MULTIMODE PUMPING OPTICAL AMPLIFIERS

This application claims the benefit of U.S. Provisional application No. 60/057,671, filed Sep. 5, 1997, and claims the right to priority based on European Application No. 97 114620.4, filed Aug. 23, 1997.

FIELD OF THE INVENTION

The present invention relates generally to a high power multimode pumped optical fiber amplifier, and more particularly, to a twin coupler system that increases the pumping efficiency of a double-clad optical fiber amplifier.

BACKGROUND OF THE INVENTION

Conventional optical fiber amplifiers include active fibers having a core doped with a rare earth element. Pump power at a characteristic wavelength for the rare earth element, when injected into the active fiber, excites the ions of the rare earth element, leading to gain in the core for an information signal propagating along the fiber.

Rare earth elements used for doping typically include Erbium (Er), Neodymium (Nd), Ytterbium (Yb), Samarium (Sm), and Praseodymium (Pr). The particular rare earth element used is determined in accordance with the wavelength of the input signal light and the wavelength of the pump light. For example, Er ions would be used for input signal light having a wavelength of 1.55μm and for pump power having a wavelength of 1.48μm or 0.98μm; codoping with Er and Yb ions, further, allows different and broader pump wavelength bands to be used.

Traditional pump sources include single mode laser diodes and multimode broad area lasers coupled to the active fiber over single mode and multimode pumping fibers, respectively, to provide the pump power. Single mode lasers provide low pump power, typically in the order of 100 mW. Broad area lasers, on the other hand, provide high pump power, in the order of 500 mW. These lasers of high output power, however, cannot efficiently inject light into the small core of a single mode fiber. Consequently, the use of high power broad area lasers requires the use of wide core and multimode fibers for pumping optical amplifiers.

Broad area lasers generate multimode pump power and input the pump power to a non-active pumping fiber. This non-active pumping fiber in turn typically inputs the pump power through a coupler and into the inner cladding of a double-clad active fiber, acting as a multimode core for the pump power.

In the amplifier fibers, pump power is guided into the inner multimode cladding of the fiber from which it is transferred into a single mode core doped with an active dopant.

A fused fiber multimode coupler has a theoretical coupling coefficient directly proportional to the ratio of the areas of the two fibers constituting the coupler itself. In an ideal case for two identical fibers, the coupling coefficient is approximately 50%. Typically, the coupling coefficient is in the range of 45–48%. This means that only about 45–48% of the total pump power output by the pump source into the pumping fiber actually passes from the pumping fiber to the inner cladding of the double-clad active fiber, while the remaining 52–55% remains in the pumping fiber.

Some systems use two optical fibers having different diameter of multimode cores to improve the coupling coefficient of the multimode coupler. However, such arrangements often lead to a waste of power due to the difficulty in matching the tapering of two cores of different size.

FIG. 1 is a block diagram of a conventional amplifying system containing a multimode pump source coupled to a primary fiber via a single traditional coupler. Primary fiber 1100 is a double-clad fiber. The information signal flows through its single mode core. Amplifier 1200, which may take the form of an Er/Yb doped double-clad active fiber, amplifies the information signal as it propagates through the single mode core of primary fiber 1100.

Multimode pump 1300 is coupled into primary fiber 1100 via multimode pump fiber 1400 and coupler 1500.

Multimode pump power generated by multimode pump 1300 is coupled into primary fiber 1100 via multimode pump fiber 1400 and coupler 1500. Coupler 1500 is a conventional fused fiber wavelength division multiplexer (WDM) type coupler. WDN couplers behave as multimode couplers for the pump power and transmit the single mode signal along the primary fiber substantially without coupling to the pump fiber. WDM couplers have maximum coupling efficiencies of 50% for the pump power, and typically have coupling efficiencies in the range of about 45%.

Multimode pump 1300 may take the form of a broad area laser that outputs pump power of approximately 450–500 mW. Due to the coupling coefficient of coupler 1500, however, only about 45% of this pump power, or approximately 200–225 mW, enters primary fiber 1100. The remaining 55% of the pump power is lost, as it exits from pump fiber 1400.

More recent systems have attempted to recover the lost pump power. FIG. 2 is a block diagram of one of these systems. The primary fiber through which the information signal flows includes signal fiber 2100 and signal fiber 2200, which are matched double-clad fibers, and amplifiers 2300 and 2400. Amplifiers 2300 and 2400, which may comprise Er/Yb doped double-clad active fibers, amplify the information signal as it propagates through the single mode core of the primary fiber.

In this system, multimode pump 2500 is coupled into the primary fiber via two identical couplers 2600 and 2700, over pump fiber 2800 and pump fiber 2900, respectively. Pump fibers 2800 and 2900 are matched multimode fibers, spliced together at a point between couplers 2600 and 2700.

Multimode pump 2500 outputs multimode pump power over pump fiber 2800. Due to the coupling coefficient of coupler 2600, only about 45% of the pump power enters signal fiber 2100. With this arrangement, however, the remaining 55% of the pump power is not lost, but, instead, enters pump fiber 2900, which couples into signal fiber 2200 via coupler 2700.

Applicants have observed that the addition of pump fiber 2900 and coupler 2700, however, does not significantly improve the total pump power transfer over the one coupler system described above. There are a few reasons for this. First, the splice between pump fiber 2800 and pump fiber 2900 results in a loss of pump power. Second, the first coupling between pump fiber 2800 and signal fiber 2100 results in most of the external modes of the pump power being transferred to signal fiber 2100, leaving only the internal modes for the second coupling. This leads to inefficient transfer of the remaining pump power at coupler 2700. Such a structure attempts to recouple most of the internal modes of the multimode pump power, those with the poorest coupling efficiency. As a result, the coupled pump power and the multimode amplifier's output power do not change significantly over the single coupler system described above.

Several articles in the patent and non-patent literature address multimode coupling techniques but do not overcome the deficiencies of other conventional approaches described above. WO 95/10868 discloses a fiber optic amplifier comprising a fiber with two concentric cores. Pump power provided by multimode sources couples transversely to the outer core of the fiber through multimode fibers and multimode optical couplers. The pump power propagates through the outer core and interacts with the inner core to pump active material contained in the inner core.

U.S. Pat. No. 5,185,814 discloses an optical communications network in which amplifiers amplify optical signals as the optical signals propagate along a waveguide. A single optical pump source coupled to the optical fiber pumps the amplifiers.

U.S. Pat. No. 5,533,163 discloses a double-clad optical fiber configuration that includes a core doped with an active gain material, and an inner cladding surrounding the core. An external pump source inputs multimode pump energy to the inner cladding. The multimode pump energy in the inner cladding transfers energy into the core through repeated interactions between the energy and the active dopant within the core.

WO 93/15536 discloses a compound glass fiber that includes an outer cladding, inner cladding, and a single mode central core. The inner cladding has a cross-sectional profile optimized to receive multimode pumping radiation. The single mode core is located within the inner cladding and doped with a lasant material to maximize transfer of the multimode pumping radiation to the single mode doped core.

U.S. Pat. No. 5,170,458 discloses an optical fiber light-amplifier that includes an optical fiber with a center core through which signal light propagates, and a pumping light generating device that applies pumping light obliquely to the optical fiber. While the pumping light propagates through the fiber, it is absorbed by and excites the center core to amplify the signal light propagated through the optical fiber.

In Applicants' view, none of the known literature has adequately addressed Applicants' discovery that conventional systems have failed to recouple sufficient pump power, thereby leading to an inadequate overall pump power transfer efficiency.

SUMMARY OF THE INVENTION

The present invention addresses the above problems in a twin coupler system that recouples more multimode pump power to a double-clad optical amplifier than conventional systems by using couplers having dissimilar tapering.

In accordance with the invention as embodied and broadly described herein, the present invention in one aspect includes a twin coupler system having a signal fiber configured to receive and transport an optical signal, a pump fiber configured to receive and transport pump power, a first coupler including the signal and pump fibers fused and tapered by a first amount to transfer a portion of the pump power from the pump fiber to the signal fiber, and a second coupler including the signal and pump fibers fused and tapered by a second amount to transfer at least some of a remaining portion of the pump power from the pump fiber to the signal fiber. The second amount of tapering is generally dependent upon the first amount of tapering to achieve a maximum total coupling efficiency for the twin coupler system.

In another aspect, the present invention also includes a method for manufacturing the twin coupler system. The manufacturing method constructs the first coupler by preparing first portions of the primary and pump fibers for coupling and performing fusion and tapering operations on the primary and pump fibers at the first portions, and constructs the second coupler by preparing second portions of the primary and pump fibers for coupling and performing fusion and tapering operations on the primary and pump fibers at the second portions. The fusion and tapering operations at the second portions are dependent upon the fusion and tapering operations performed at the first portions so as to achieve a maximum coupling efficiency of the pump power from the pump fiber to the primary fiber for the entire twin coupler system.

In another aspect, the present invention includes an apparatus for manufacturing the twin coupler system. The apparatus includes means for preparing first and second portions of both the signal fiber and the pump fiber for coupling, and means for performing fusion and stretching operations on the signal and pump fibers at the first and second portions. The fusion and stretching operations at the first portions form the first coupler, and the fusion and stretching operations at the second portions form the second coupler and are dependent upon the fusion and stretching operations performed in forming the first coupler.

The present invention further includes an apparatus for manufacturing at least first and second optical couplers of a multiple coupler system for coupling a multimode pump fiber to a double-clad active signal fiber. The apparatus includes means for supplying a multimode optical signal to the pump fiber, means for fusing the signal and pump fibers at first and second spaced locations, means for tapering the signal and pump fibers at the first and second locations, means for monitoring a coupling efficiency based on an amount of the multimode optical power transferred from the pump fiber to the signal fiber at the first and second couplers, and means for controlling the fusing and tapering means to heat and stretch the signal and pump fibers at the first locations to produce the first coupler based on the monitored coupling efficiency for the first coupler, and for controlling the fusing and tapering means to heat and stretch the signal and pump fibers at the second locations to produce the second coupler based on the coupling efficiency for the first coupler and the monitored coupling efficiency for the second coupler.

In another aspect, the present invention includes a method for manufacturing at least first and second optical couplers of a multiple coupler system for coupling a double-clad active signal fiber and a multimode pump fiber. The method includes the steps of supplying a multimode optical signal to the pump fiber, heating and stretching first portions of the signal and pump fibers to produce the first coupler, monitoring a coupling efficiency for the first coupler based on an amount of the multimode optical power transferred from the pump fiber to the signal fiber at the first coupler, controlling the first portions heating and stretching step to achieve a maximum value for the coupling efficiency for the first coupler, heating and stretching second portions of the signal and pump fibers to produce the second coupler, monitoring a coupling efficiency for the second coupler based on an amount of the multimode optical power transferred from the pump fiber to the signal fiber at the second coupler, and controlling the second portions heating and stretching step to achieve a maximum total coupling efficiency for the multiple coupler system based on the achieved maximum coupling efficiency for the first coupler and the coupling efficiency for the second coupler.

BRIEF DESCRIPTION OF THE DRAWINGS

The accompanying drawings, which are incorporated in and constitute a part of this specification, illustrate an embodiment of the invention and, together with the description, explain the objects, advantages and principles of the invention. In the drawings.

It is to be understood that both the foregoing general description and the following detailed description are exemplary and are intended to provide further explanation of the invention as claimed.

DETAILED DESCRIPTION OF THE PREFERRED EMBODIMENTS

The following detailed description of the invention refers to the accompanying drawings. The same reference numbers identify the same or similar elements.

The description includes exemplary embodiments, other embodiments are possible, and changes may be made to the embodiments described without departing from the spirit and scope of the invention. The following detailed description does not limit the invention. Instead, the scope of the invention is defined only by the appended claims.

Systems and methods consistent with the principles of the present invention achieve high transfer efficiency of multimode pumping power to an active, information-carrying, double-clad fiber using a twin-coupler system having two dissimilar couplers.

Figure 1:
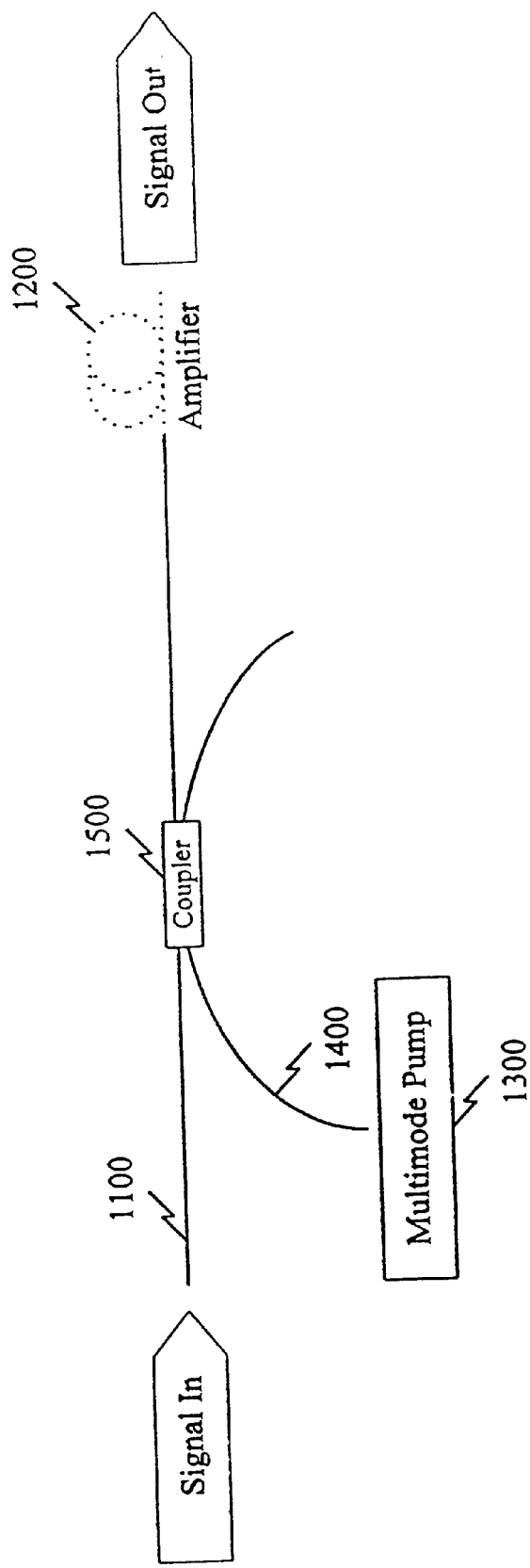
FIG. 1 is a block diagram of a conventional system containing a multimode pump source coupled to a primary fiber via a single traditional coupler.
Figure 2:
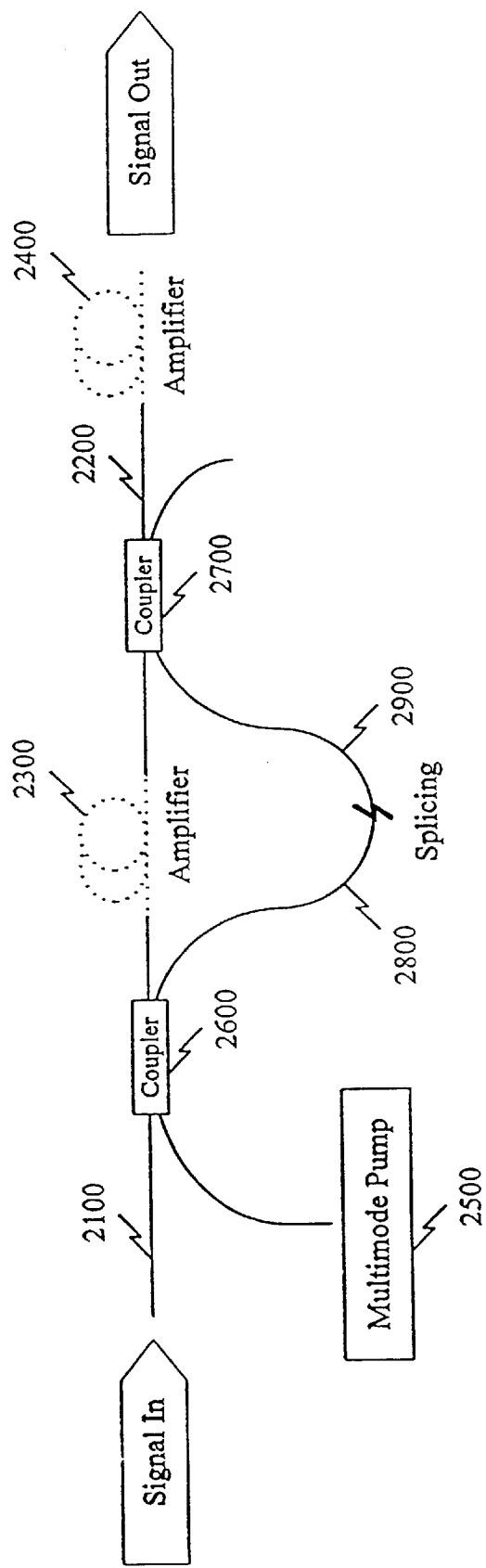
FIG. 2 is a block diagram of a system that recovers a portion of the lost pump power.
Figure 3:
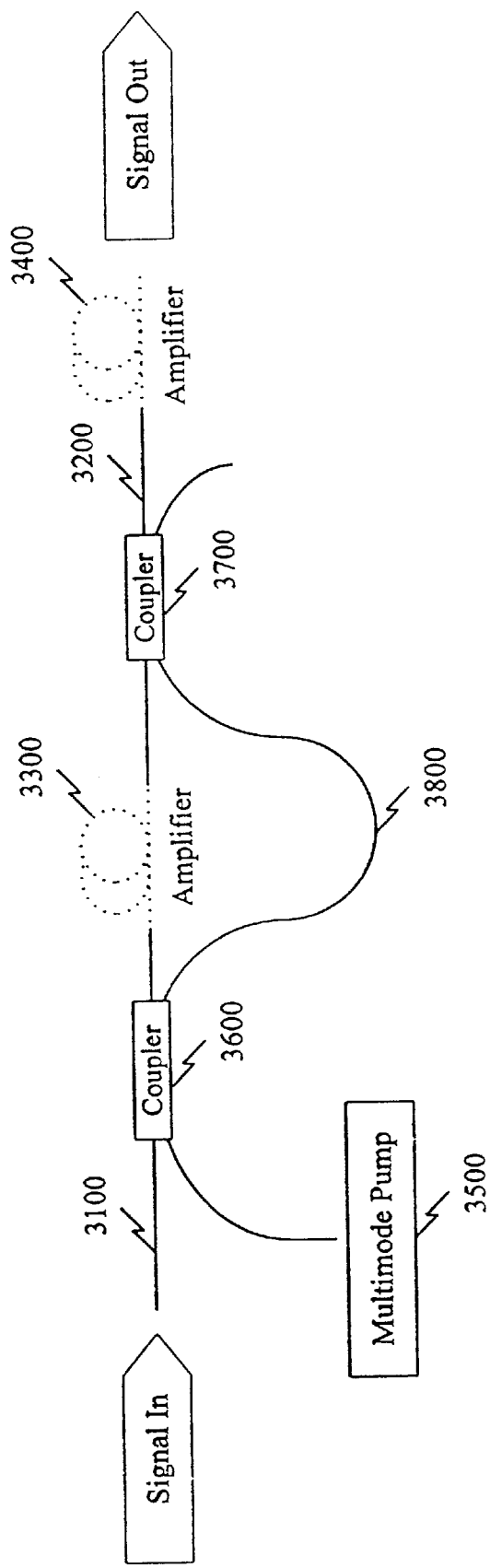
FIG. 3 is a diagram of a twin coupler system consistent with the principles of the present invention.

FIG. 3 is a diagram of an amplifier system having a twin coupler system consistent with the principles of the present invention. The amplifier system can be coupled as a high power optical amplifier in an optical fiber communication system; in this case input of fiber 3100 and output of amplifier fiber 3400 are in general spliced to a single mode fiber of the communication system. The amplifier system may to advantage constitute a power booster amplifier or a line amplifier.

The system includes two different types of multimode/single mode optical fibers, a primary fiber and a pump fiber, coupled together by two dissimilar couplers. The primary fiber contains an embedded single mode core to carry an information signal.

Figure 4A:
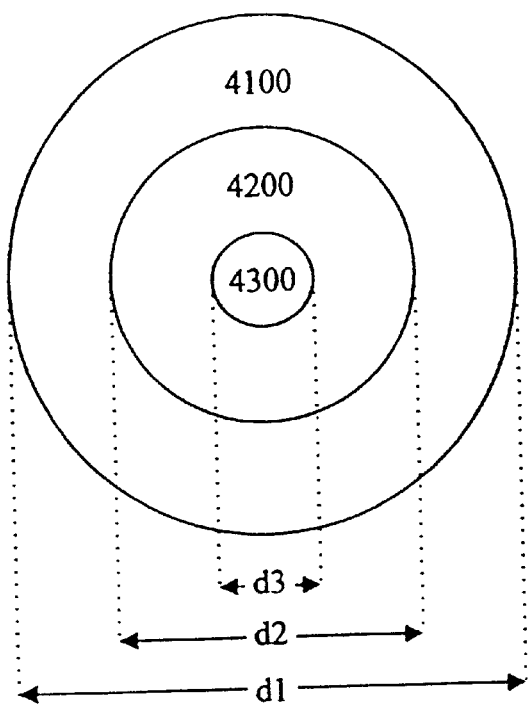
FIG. 4A is a diagram depicting a cross-sectional view of the primary fiber of FIG. 3.

The primary fiber includes signal fibers 3100 and 3200 and optical amplifiers 3300 and 3400. Signal fibers 3100 and 3200 are matched double-clad optical fibers, while optical amplifiers 3300 and 3400 are double-clad Er/Yb fibers doped to amplify the information signal as it propagates through the primary fiber. FIG. 4A is a diagram depicting a cross-sectional view of the primary fiber, and FIG. 4B is a graph of the different indexes of refraction of the primary fiber.

Figure 4B:
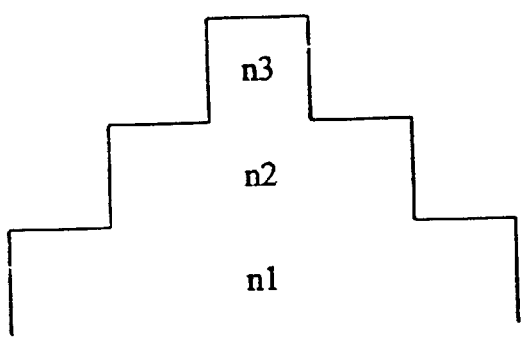
FIG. 4B is a graph of the different indexes of refraction of the primary fiber of FIG. 3.

As shown in FIGS. 4A and 4B, the primary fiber (3100, 3200) includes three kinds of glass forming concentric regions 4100, 4200, and 4300 having different indexes of refraction n1, n2, and n3, respectively, and different diameters d1, d2, and d3, respectively. In an implementation consistent with the principles of the present invention, the primary fiber is constructed such that the indexes of refraction have the relationship n1<n2<n3, and the diameters d1, d2, and d3 of the three concentric regions 4100, 4200, and 4300 achieve single mode optical propagation for the information signal in region 4300 and multimode optical propagation for the pump power in region 4200. In other words, region 4300 surrounded by region 4200 forms a single mode core for the information signal. Region 4200 surrounded by region 4100, on the other hand, forms a multimode core for the pump power.

In an implementation consistent with the principles of the present invention, the indexes of refraction and the diameters of concentric regions 4100, 4200, and 4300 have the following relationships:

$$\sqrt{n3^2-n2^2}=0.19 \quad (1)$$

$$\sqrt{n2^2-n1^2}=0.21 \quad (2)$$

$$d1=90 \mu m \quad (3)$$

$$d2=65 \mu m \quad (4)$$

$$d3=4 \mu m \quad (5)$$

Figure 5A:
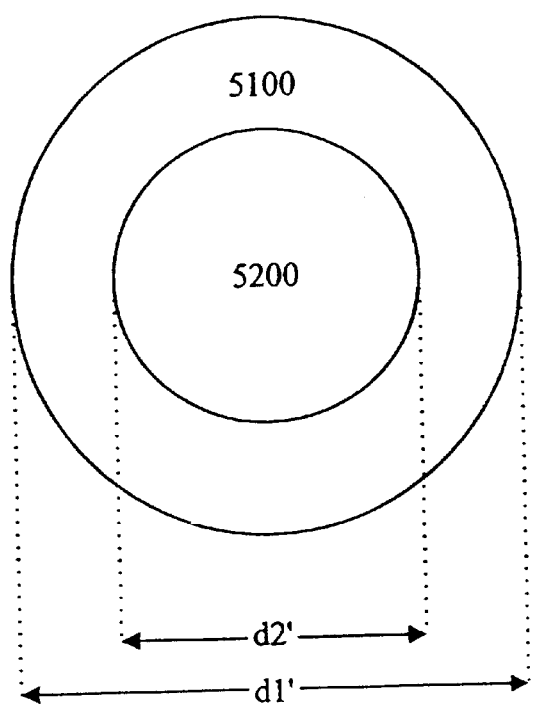
FIG. 5A is a diagram depicting a cross-sectional view of the pump fiber of FIG. 3.

Multimode pump 3500 connects to the primary fiber (3100, 3200) via couplers 3600 and 3700 to supply pump power. In an implementation consistent with the principles of the present invention, multimode pump 3500 is a broad area laser that outputs multimode pump power to pump fiber 3800. Pump fiber 3800 is a multimode optical fiber that carries the multimode pump power. FIG. 5A is a diagram depicting a cross-sectional view of pump fiber 3800, and FIG. 5B is a graph of the different indexes of refraction of pump fiber 3800.

Figure 5B:
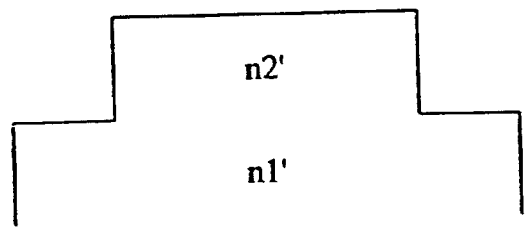
FIG. 5B is a graph of the different indexes of refraction of the pump fiber of FIG. 3.
Figure 6A:
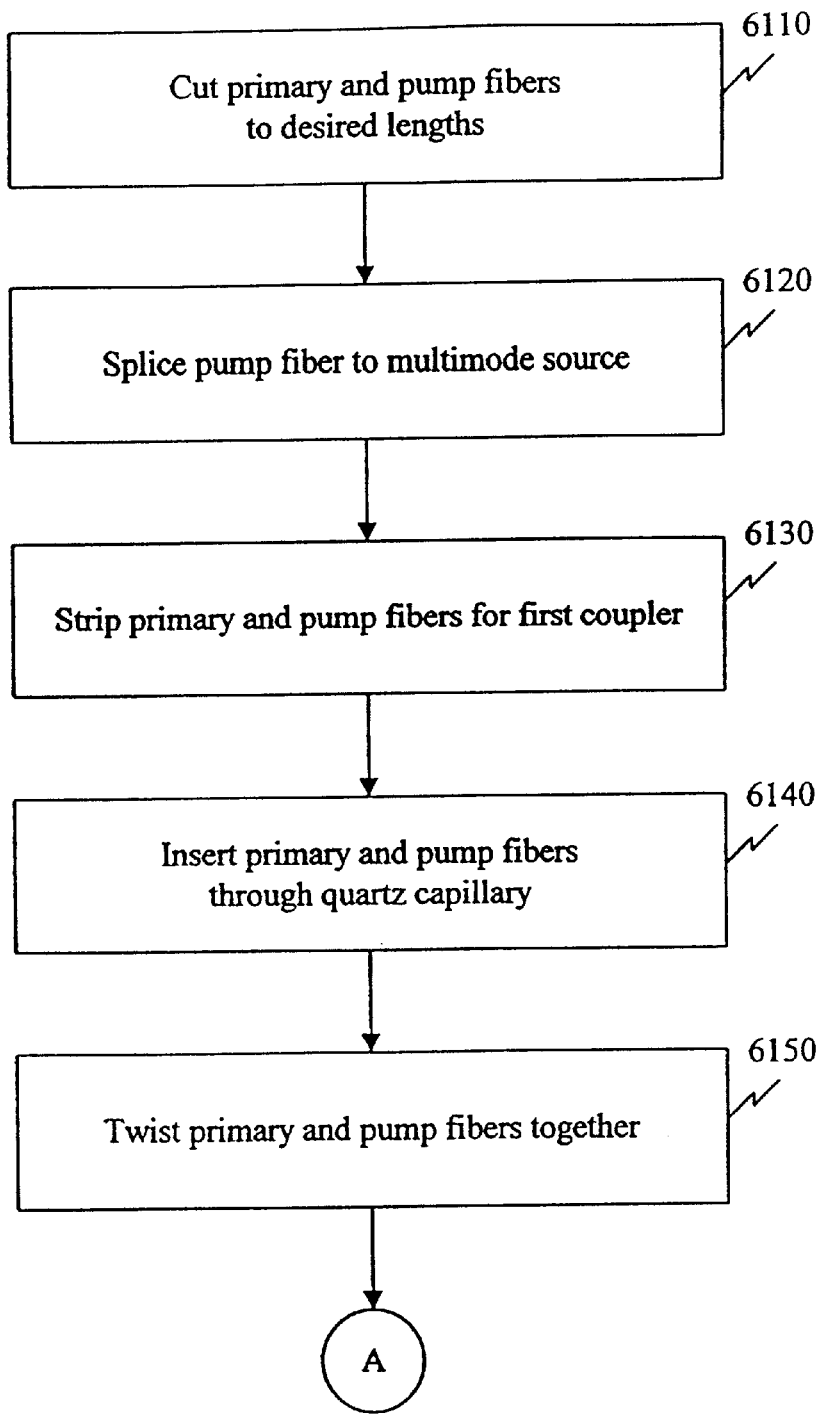
FIGS. 6A–6D are flow charts describing a method for manufacturing the twin coupler system consistent with the principles of the present invention.
Figure 6B:
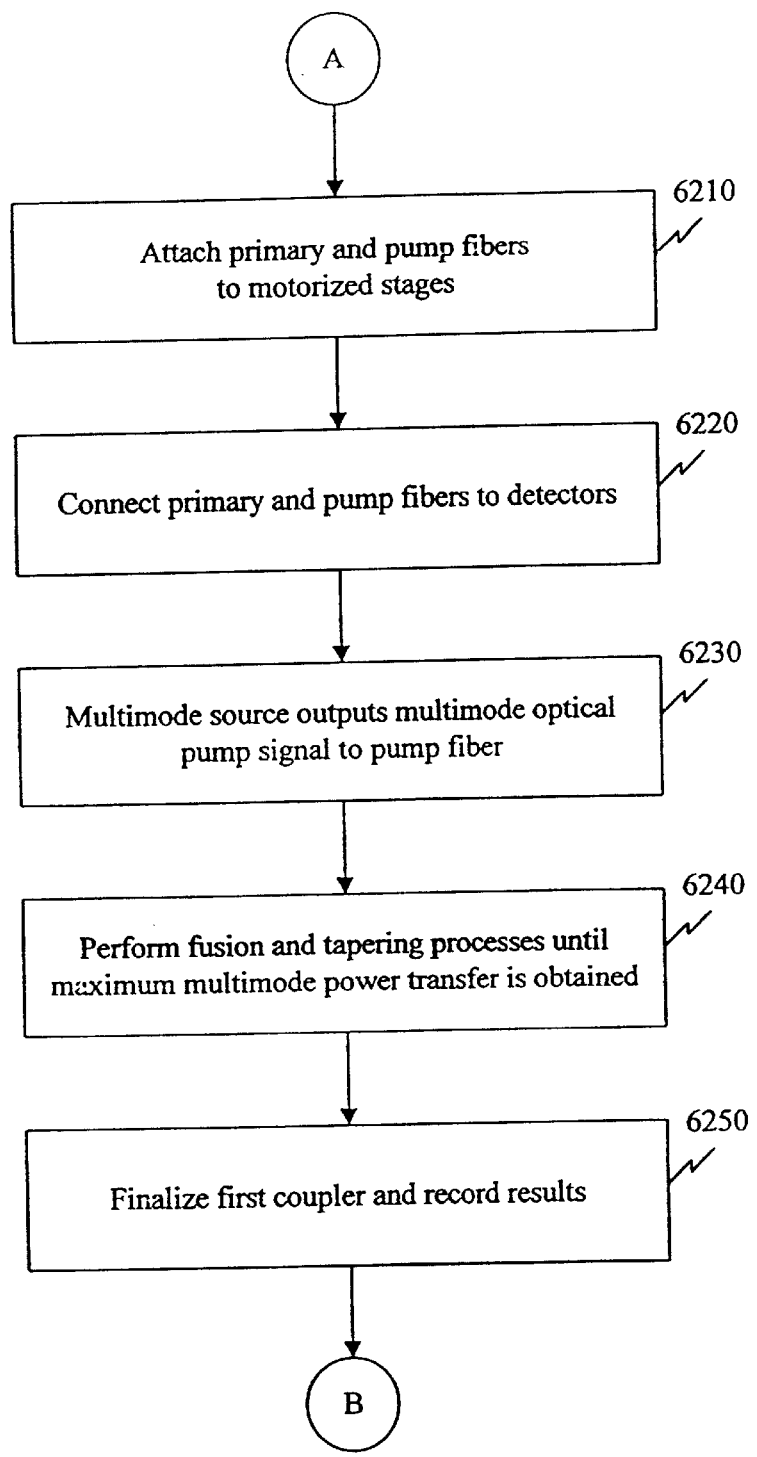
Figure 6C:
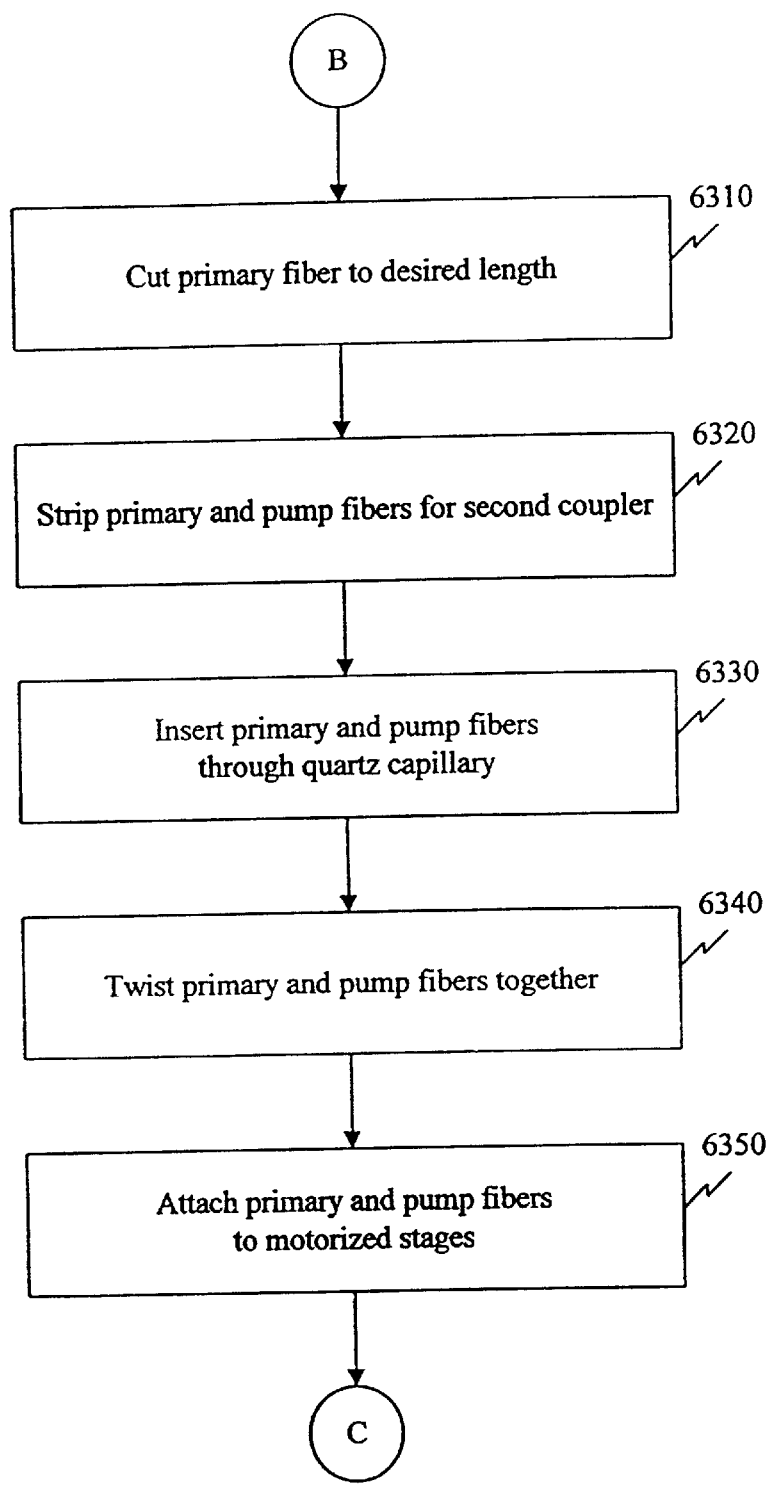
Figure 6D:
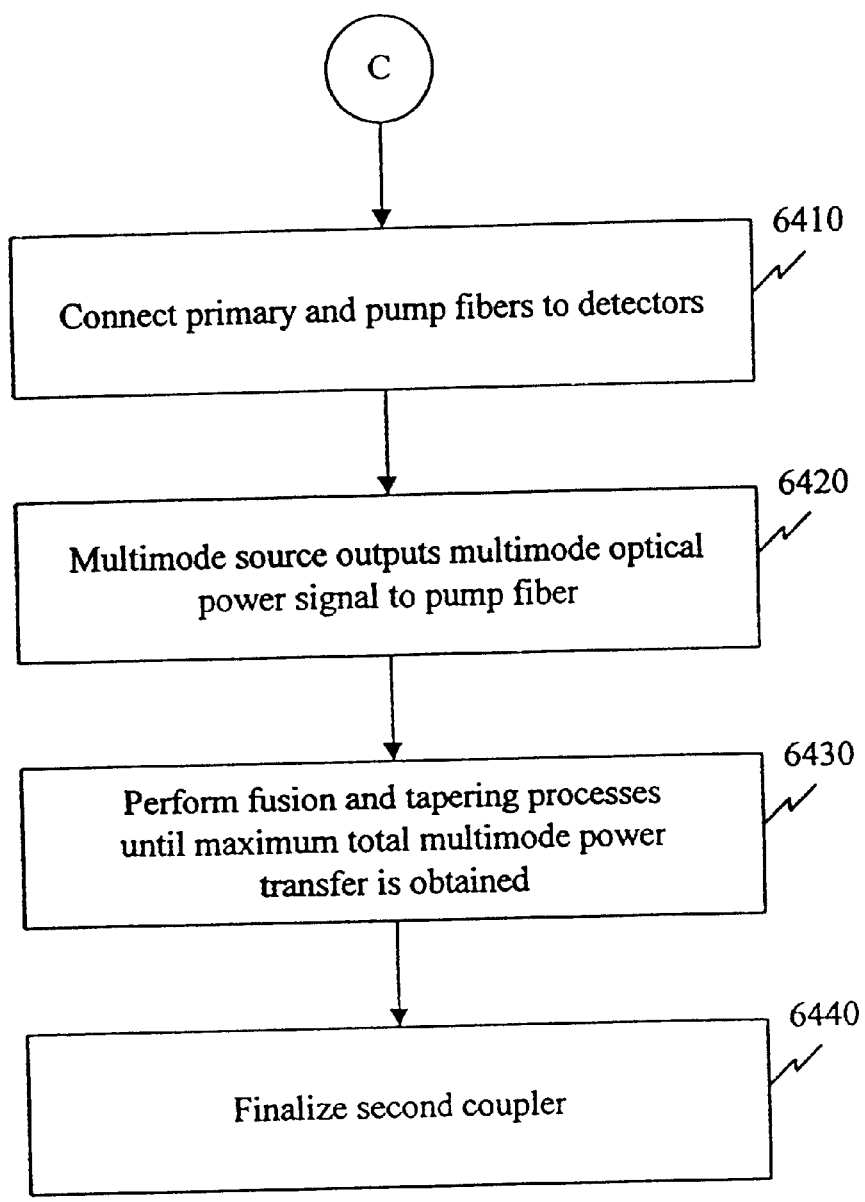

As shown in FIGS. 5A and 5B, pump fiber 3800 includes two different types of glass forming concentric regions 5100 and 5200 having different indexes of refraction n1' and n2', respectively, and different diameters d1' and d2', respectively. In an implementation consistent with the principles of the present invention, pump fiber 3800 is constructed such that the indexes of refraction have the relationship n1'<n2'. The diameters d1' and d2' of the two concentric regions 5100 and 5200 achieve multimode optical propagation for the pump power in region 5200. In other words, region 5200 surrounded by region 5100 forms a multimode core for the pump power.

In an implementation consistent with the principles of the present invention, the indexes of refraction and the diameters of concentric regions 5100 and 5200 have the following relationships:

$$\sqrt{(n2')^2-(n1')^2}=0.21 \quad (6)$$

$$d1'=90\mu m \quad (7)$$

$$d2'=65\mu m \quad (8)$$

Even though the concentric regions of pump fiber 3800 have been described as having the same indices of refraction and diameters as the concentric regions of the primary fiber (3100, 3200), this need not be the case.

Both the primary fiber (3100, 3200) and pump fiber 3800 contain a protective plastic coating surrounding the outer concentric region (4100, 5100). In an implementation consistent with the principles of the present invention, the protective plastic coating has a thickness such that the external diameter of both the primary fiber (3100, 3200) and pump fiber 3800 is approximately 250 μm. The external diameters may, of course, be different values, and the external diameters of the primary fiber (3100, 3200) and pump fiber 3800 need not be the same.

Couplers 3600 and 3700 are dissimilar optical fiber couplers for transferring pump power from pump fiber 3800 to the primary fiber (3100, 3200). In an implementation consistent with the principles of the present invention, couplers 3600 and 3700 are manufactured by a fusion biconical tapering technique described below.

Figure 7:
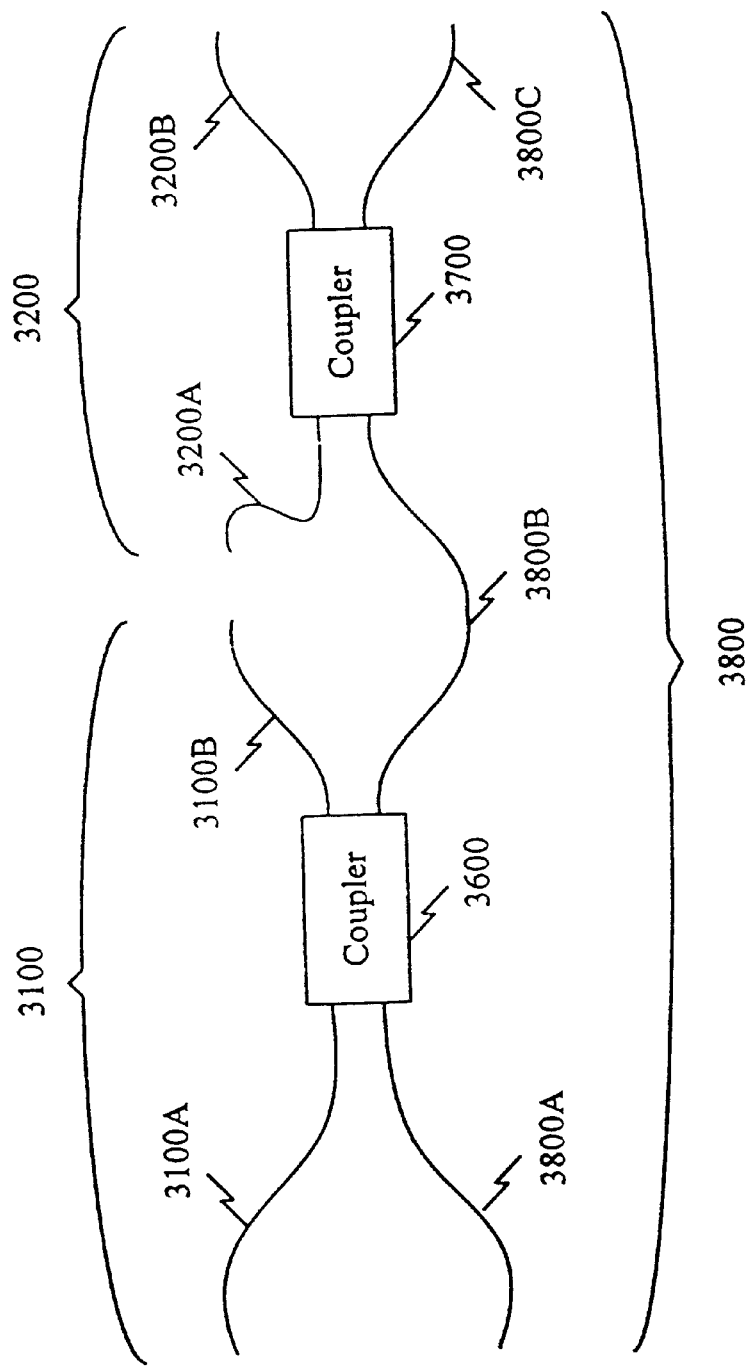
FIG. 7 is a block diagram of a simplified version of the twin coupler system of FIG. 3.
Figure 8:
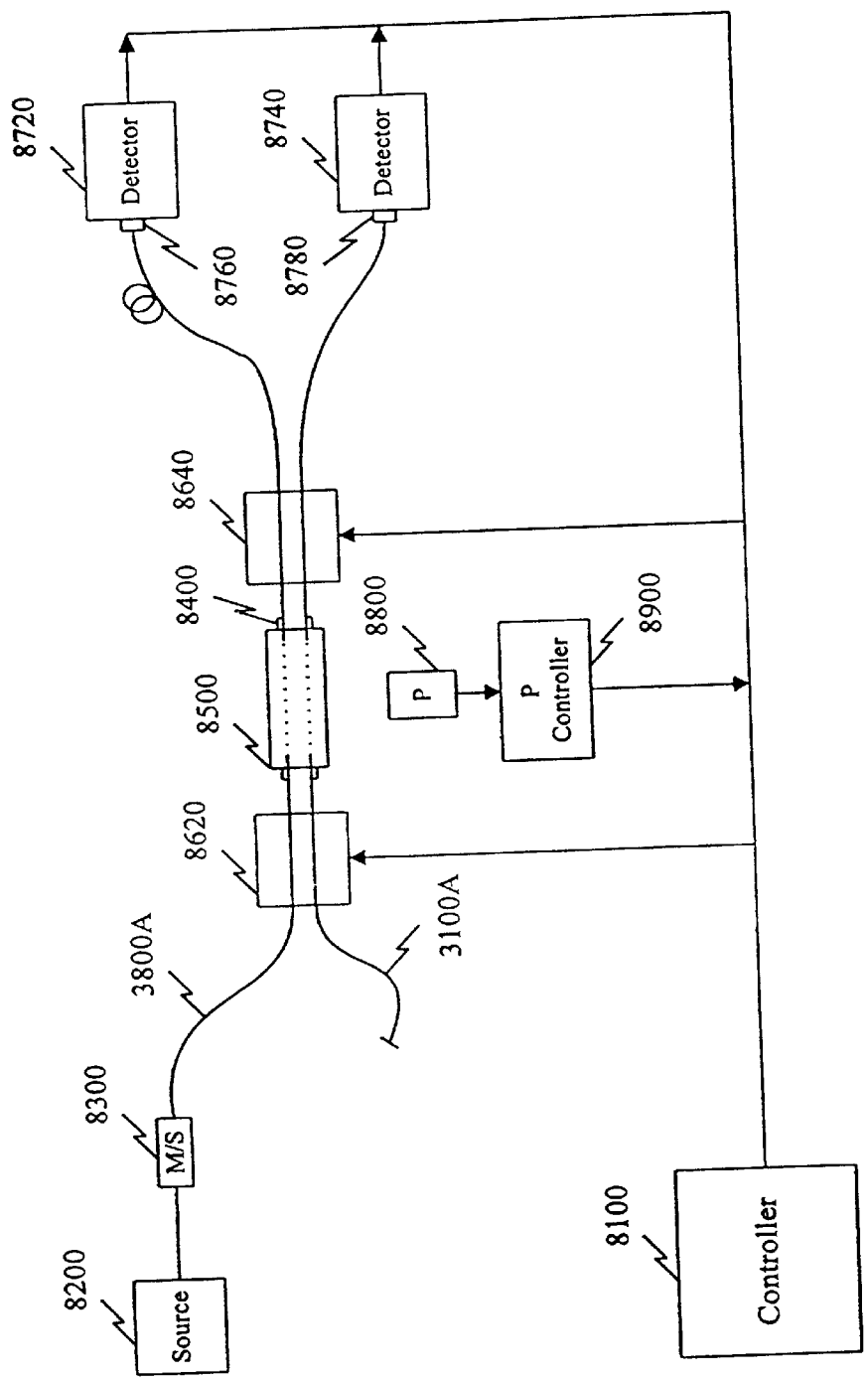
FIG. 8 is a block diagram of the equipment used for manufacturing a first coupler of FIG. 3.
Figure 10:
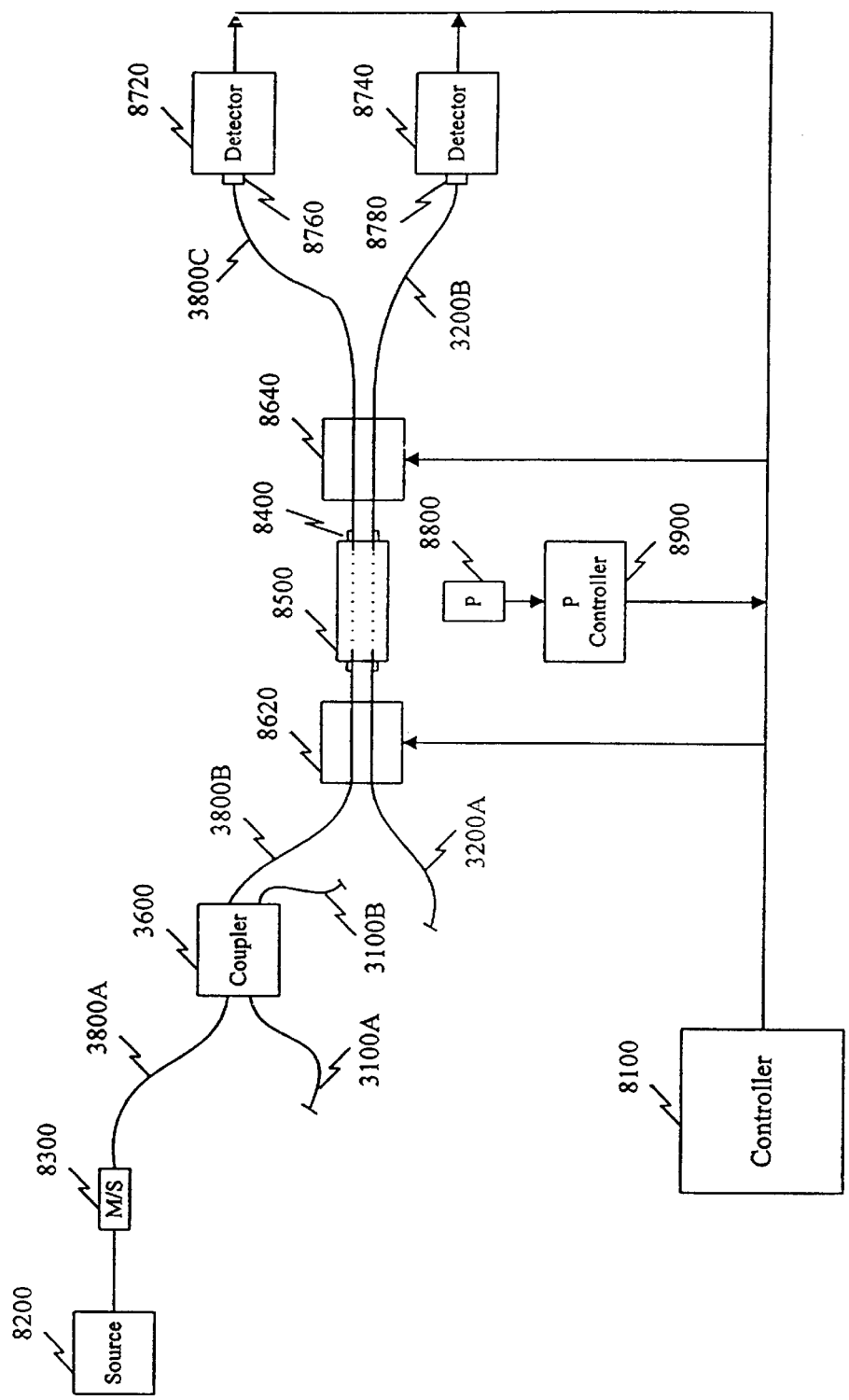
FIG. 10 is a block diagram of the equipment used for manufacturing a second coupler of FIG. 3.

FIGS. 6A–6D are flow charts describing a method for manufacturing a twin coupler system consistent with the principles of the present invention. FIG. 7 is a simplified block diagram of the twin coupler system of FIG. 3. FIGS. 8 and 10 are block diagrams of equipment used for manufacturing the first and second couplers 3600 and 3700 of FIG. 3, respectively.

Turning first to FIG. 8, equipment used in a manufacturing method consistent with the principles of the present invention will be described first to facilitate description of the manufacturing method with regard to FIGS. 6A–6D. The manufacturing equipment comprises conventional equipment, including controller 8100, multimode source 8200, mode scrambler 8300, quartz capillary 8400, cylindrical heater 8500, motorized stages 8620 and 8640, detectors 8720 and 8740 with adapters 8760 and 8780, pyrometer 8800, and pyrometer controller 8900.

Controller 8100 may take the form of a personal computer, such as an IBM™-compatible computer. Controller 8100 controls the operation of the manufacturing equipment. Multimode source 8200 may be any light source, such as a broad area laser, that generates a multimode optical signal. In accordance with an implementation consistent with the principles of the present invention, multimode source 8200 generates a multimode optical signal having a wavelength equal to 0.98 μm. Mode scrambler 8300, spliced into the output fiber of multimode source 8200, scrambles the modes of the multimode optical signal generated by multimode source 8200.

Quartz capillary 8400 secures signal fiber 3100 and pump fiber 3800 for fusing and tapering. Cylindrical heater 8500 encompasses quartz capillary 8400 and provides heat for fusing signal fiber 3100 and pump fiber 3800 together to form coupler 3600. Motorized stages 8620 and 8640 grip signal fiber 3100 and pump fiber 3800 on either side of cylindrical heater 8500. Motorized stages 8620 and 8640, under control of controller 8100, stretch signal fiber 3100 and pump fiber 3800 to form coupler 3600.

Detectors 8720 and 8740 are attached to the end of signal fiber 3100 and pump fiber 3800 opposite multimode source 8200 via suitable adapters 8760 and 8780. Detectors 8720 and 8740 detect the amount of the power signal transfer from pump fiber 3800 to signal fiber 3100 that takes place in coupler 3600 (i.e., the coupling efficiency), and report the amount to controller 8100. Pyrometer 8800, in conjunction with pyrometer controller 8900, monitors the temperature of the external wall of cylindrical heater 8500 during formation of coupler 3600.

Turning to FIGS. 6A–6D, a manufacturing method consistent with the principles of the present invention begins by cutting a double-clad optical fiber (i.e., the primary fiber) to a length approximately equal to the sum of the expected lengths of signal fiber section 3100A and signal fiber section 3100B (FIG. 7) [step 6110]. Next, a multimode optical fiber (i.e., pump fiber 3800) is cut to have a length approximately equal to the sum of the expected lengths of sections 3800A, 3800B, and 3800C of pump fiber 3800 (FIG. 7) [step 6110].

Mode scrambler 8300 is spliced into the output fiber of multimode source 8200, and pump fiber 3800 is, in turn, spliced into mode scrambler 8300 [step 6120]. Next, both signal fiber 3100 and pump fiber 3800 are stripped (i.e., the coating is removed) for a length of approximately 4 cm [step 6130]. Signal fiber 3100 is stripped at a location equal to the length of signal fiber section 3100A and pump fiber 3800 is stripped at a location equal to the length of pump fiber section 3800A. The stripping may be made by any conventional method.

Signal fiber 3100 and pump fiber 3800 are inserted into quartz capillary 8400, which is centered inside cylindrical heater 8500 [step 6140]. Signal fiber 3100 and pump fiber 3800 are inserted in quartz capillary 8400 such that the stripped areas of the fibers are centered in quartz capillary 8400, and signal fiber section 3100A and pump fiber section 3800A are located on the same side of quartz capillary 8400. Signal fiber 3100 and pump fiber 3800 are then twisted to ensure contact with each other in the stripped areas [step 6150]. The twisting may be performed by any conventional method.

Signal fiber 3100 and pump fiber 3800 are then attached to motorized stages 8620 and 8640 at either side of quartz capillary 8400 [step 6210]. The ends of signal fiber 3100 and pump fiber 3800, opposite multimode source 8200, are cleaved and inserted into detectors 8720 and 8740 through suitable adapters 8760 and 8780, respectively [step 6220].

Multimode source 8200 outputs a multimode optical power signal to mode scrambler 8300 [step 6230]. Mode scrambler 8300 scrambles the modes of the power signal and outputs the scrambled power signal to pump fiber section 3800A [step 6230]. Detectors 8720 and 8740 monitor the amount of the power signal transferred from pump fiber 3800 to signal fiber 3100, and reports this information to controller 8100.

Controller 8100 initiates fusion and tapering operations performed by cylindrical heater 8500 and motorized stages 8620 and 8640, respectively [step 6240]. Pyrometer 8800, in conjunction with pyrometer controller 8900, constantly monitors the temperature of the external wall of cylindrical heater 8500, and reports the temperature to controller 8100.

Figure 9A:
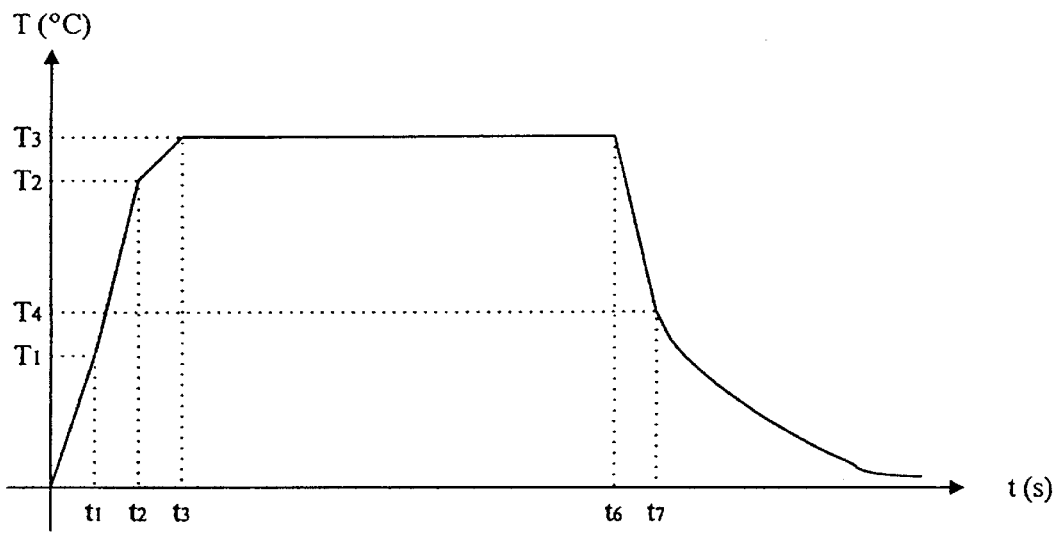
FIGS. 9A and 9B are graphs depicting temperature and speed profiles, respectively, for the fusion and tapering operations to produce the first coupler.
Figure 9B:
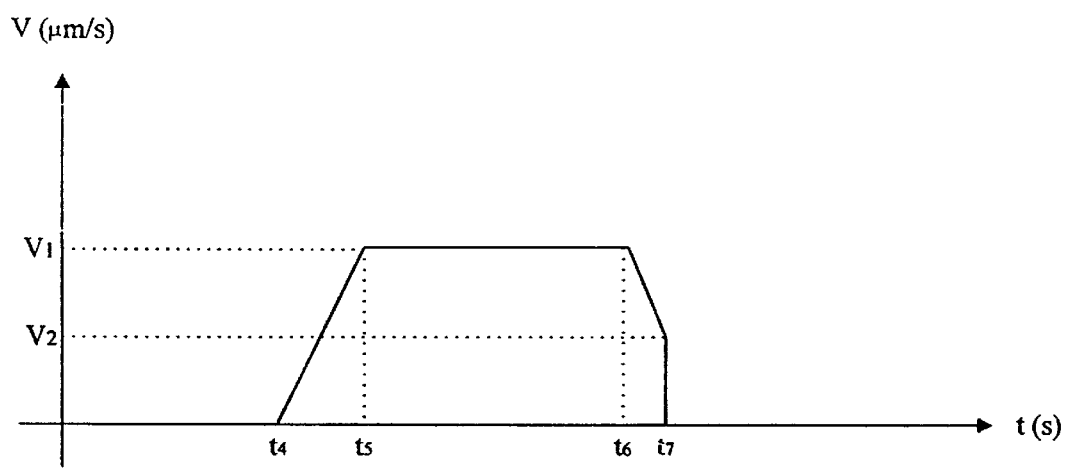

Controller 8100 regulates the fusion and tapering operations on the basis of the temperature of cylindrical heater 8500 as it heats signal fiber 3100 and pump fiber 3800, the speed of motorized stages 8620 and 8640 as they stretch signal fiber 3100 and pump fiber 3800, and the fusion time before motorized stages 8620 and 8640 begin stretching. FIGS. 9A and 9B are graphs depicting temperature and speed profiles for the fusion and tapering operations, respectively, during formation of coupler 3600. In an implementation consistent with the principles of the present invention, the variables t1–t7 (in seconds), T1–T4 (in ° C.), V1, and V2 (in μm/sec) are as follows:

| | |
|---|---|
| t1 = 10 | T1 = 850 |
| t2 = 20 | T2 = 1150 |
| t3 = 30 | T3 = 1380 |
| t4 = 60 | T4 = 900 |
| t5 = 80 | V1 = 30 |
| t6 = 380 | V2 = 20 |
| t7 = 390 | |

Controller 8100 stops the fusion and tapering operations once controller 8100 determines that coupler 3600 has achieved a maximum multimode power transfer from pump fiber 3800 to signal fiber 3100, with a minimum amount of power loss. Controller 8100 makes this determination based on the information received from detectors 8720 and 8740. Based on the information from the embodiment provided above, coupler 3600 would have a maximum multimode power transfer, or coupling efficiency, of 44% and a power loss of 0.29 dB.

When controller 8100 obtains the maximum coupling efficiency and minimum power loss for coupler 3600, the structure formed by the fused and tapered fibers is fixed at quartz capillary 8400 by epoxy, thereby completing coupler 3600 [step 6250]. Controller 8100 records the results to aid in calculating the total coupling efficiency of the final twin coupler system [step 6250].

Once controller 8100 completes coupler 3600, coupler 3700 is formed while keeping the monitoring system online (see FIG. 10). A double-clad optical fiber (ie., the primary fiber) is cut to a length approximately equal to the sum of the expected lengths of signal fiber section 3200A and signal fiber section 3200B (FIG. 7) [step 6310]. Next, both signal fiber 3200 and pump fiber 3800 are stripped for a length of approximately 4 cm [step 6320]. Signal fiber 3200 is stripped at a location equal to the length of signal fiber section 3200A, and pump fiber 3800 is stripped at a location equal to the sum of the lengths of pump fiber sections 3800A and 3800B from the end connected to multimode source 8200. The stripping may be made by any conventional method.

In FIG. 10, signal fiber 3200 and pump fiber 3800 are inserted into quartz capillary 8400, which is centered inside cylindrical heater 8500 [step 6330]. Signal fiber 3200 and pump fiber 3800 are inserted in quartz capillary 8400 such that the stripped areas of the fibers are centered in quartz capillary 8400, and signal fiber section 3200A and pump fiber section 3800B are located on the same side of quartz capillary 8400. Signal fiber 3200 and pump fiber 3800 are then twisted to ensure contact with each other in the stripped areas [step 6340]. The twisting may be performed by any conventional method.

Signal fiber 3200 and pump fiber 3800 are then attached to motorized stages 8620 and 8640 at either side of quartz capillary 8400 [step 6350]. The end of signal fiber 3200, opposite multimode source 8200, is cleaved and both signal fiber 3200 and pump fiber 3800 are inserted into detectors 8720 and 8740 through suitable adapters 8760 and 8780, respectively [step 6410].

Multimode source 8200 outputs a multimode optical power signal to mode scrambler 8300 [step 6420]. Mode scrambler 8300 scrambles the modes of the power signal and outputs the scrambled power signal to pump fiber section 3800A [step 6420]. Detectors 8720 and 8740 monitor the amount of the power signal transferred from pump fiber 3800 to signal fiber 3200, and reports this information to controller 8100.

Controller 8100 initiates the fusion and tapering operations performed by cylindrical heater 8500 and motorized stages 8620 and 8640, respectively [step 6430]. Pyrometer 8800, in conjunction with pyrometer controller 8900, again monitors the temperature of the external wall of cylindrical heater 8500, and reports the temperature to controller 8100.

Figure 11A:
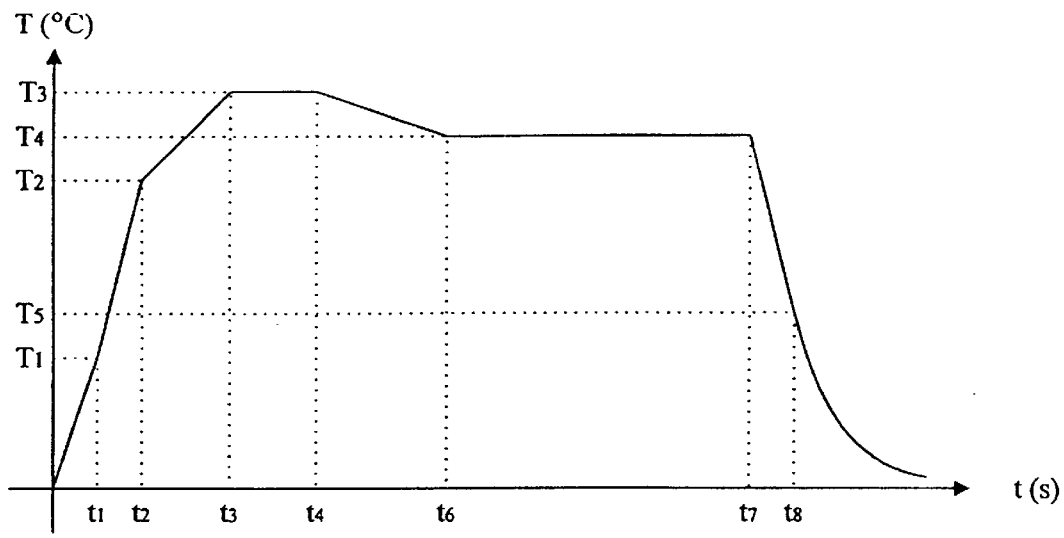
FIGS. 11A and 11B are graphs depicting temperature and speed profiles, respectively, for the fusion and tapering operations to produce the second coupler.
Figure 11B:
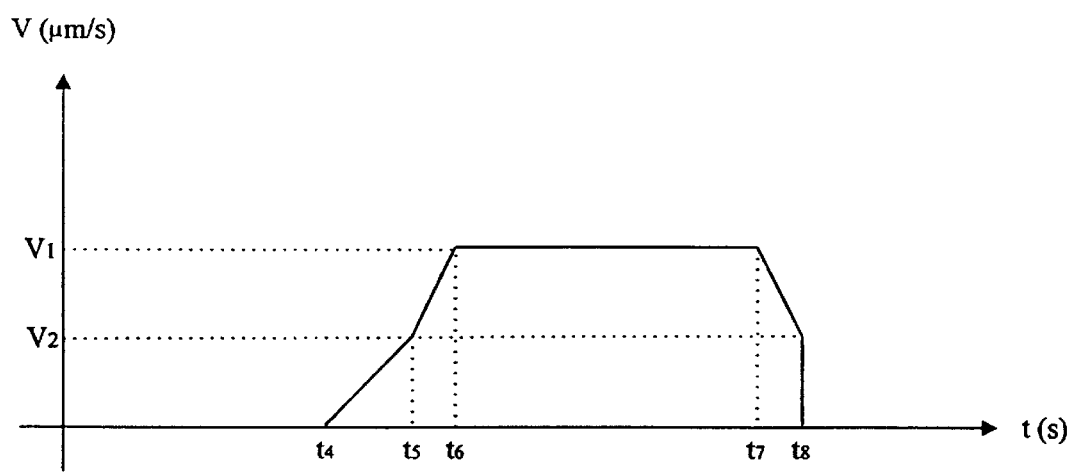

Controller 8100 regulates the fusion and tapering operations on the basis of the temperature of cylindrical heater 8500 as it heats signal fiber 3200 and pump fiber 3800, the speed of motorized stages 8620 and 8640 as they stretch signal fiber 3200 and pump fiber 3800, and the fusion time before motorized stages 8620 and 8640 begin stretching. FIGS. 11A and 11B are graphs depicting temperature and speed profiles for the fusion and tapering operations, respectively, during formation of coupler 3700. In an implementation consistent with the principles of the present invention, the variables t1–t8 (in seconds), T1–T5 (in ° C.), V1, and V2 (in μm/sec) are as follows:

| | |
|---|---|
| t1 = 10 | T1 = 850 |
| t2 = 20 | T2 = 1150 |
| t3 = 40 | T3 = 1400 |
| t4 = 60 | T4 = 1370 |
| t5 = 80 | T5 = 900 |
| t6 = 90 | V1 = 30 |
| t7 = 420 | V2 = 20 |
| t8 = 430 | |

The temperature and speed profiles for forming coupler 3700 are different than the profiles for forming coupler 3600. Controller 8100 tapers coupler 3700 more than coupler 3600 and with a different shape because the mode distribution of the power signal remaining in pump fiber section 3800B after coupler 3600 is different from the mode distribution of the power signal in pump fiber section 3800A.

Controller 8100 regulates the fusion and tapering operations to maximize the coupling efficiency as a result of the mode distribution of the power signal remaining after coupler 3600. The tapering of coupler 3700 creates matched mode scrambling of the power signal remaining in pump fiber section 3800B after coupler 3600.

Controller 8100 stops the fusion and tapering operations once controller 8100 determines that the operations have obtained a maximum total multimode power transfer from pump fiber 3800 to the primary fiber. Controller 8100 makes such a determination based on the information received from detectors 8720 and 8740 in forming coupler 3700 and the information previously recorded from the formation of coupler 3600.

Based on the information from the embodiment provided above, the twin coupler system, consistent with the principles of the present invention, would have a total coupling efficiency of 66%, much better than the 50–55% efficiency achieved by conventional systems, total coupled pump power of 300 mW and, by proper selection of length and doping of the amplifying fibers, a saturated output power of the amplifier equal to 18.5 dBm. When controller 8100 obtains the maximum total coupling efficiency, the structure formed by the fused and tapered fibers is fixed at quartz capillary 8400 by epoxy, thereby completing coupler 3700 [step 6440].

The systems and methods consistent with the principles of the present invention transfer multimode pump power to an active double-clad fiber with increased coupling efficiency over conventional systems by using a pair of dissimilar couplers.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, though an amplifying system for single mode optical signals has been disclosed so far, the skilled in the art may use this invention with an amplifying system for multimode signals by adopting, where appropriate, fibers having a multimode signal core instead of a single mode core.

The foregoing description included specific data values obtained through experimentation. These values serve as examples only and the true scope of the invention is defined only by the claims and their equivalents.

What is claimed is:

1. An optical amplifier system comprising:
   a signal fiber configured to receive and transport an optical signal;
   a pump fiber configured to receive and transport pump power;
   a first coupler including the signal and pump fibers fused and tapered by a first amount to transfer a portion of the pump power from the pump fiber into the signal fiber; and
   a second coupler including the signal and pump fibers fused and tapered by a second amount to transfer at least some of a remaining portion of the pump power from the pump fiber to the signal fiber, the second amount being dependent upon the first amount to achieve a maximum total coupling efficiency for the optical amplifier system.

2. The optical amplifier system of claim 1, wherein the signal fiber includes
   a first double-clad active fiber coupled to the pump fiber via the first coupler, and
   a second double-clad active fiber coupled to the pump fiber via the second coupler.

3. The optical amplifier system of claim 2, wherein the signal fiber further includes
   an optical amplifier coupled between the first and second double-clad active fibers, the optical amplifier including an active double-clad fiber doped with a rare earth element.

4. The optical amplifier system of claim 1, wherein the pump fiber includes
   a multimode pump fiber configured to receive and transport multimode pump power.

5. The optical amplifier system of claim 4, wherein the multimode pump fiber includes a single multimode fiber coupled to the signal fiber via the first and second couplers.

6. The optical amplifier system of claim 1, wherein the total coupling efficiency for the optical amplifier system is approximately 66%.

7. A method of manufacturing an optical amplifier configured in a twin coupler system having first and second optical couplers for coupling a pump fiber, configured to carry pump power, to a primary fiber, configured to carry optical information signals, comprising the steps of:
   preparing first portions of the primary and pump fibers for coupling;
   performing fusion and tapering operations on the primary and pump fibers at the first portions to construct the first coupler;
   preparing second portions of the primary and pump fibers for coupling; and
   performing fusion and tapering operations on the primary and pump fibers at the second portions to construct the second coupler, the fusion and tapering operations at the second portions being dependent upon the fusion and tapering operations performed at the first portions.

8. The manufacturing method of claim 7, further including the step of
   supplying a multimode optical signal to the pump fiber;
   wherein the fusion and tapering step for the first coupler further includes the substeps of
      determining when a maximum transfer of the multimode optical signal from the pump fiber to the primary fiber is obtained during the fusion and tapering operations at the first portions, and
      discontinuing the fusion and tapering operations at the first portions when it is determined that the maximum multimode optical signal transfer is obtained.

9. The manufacturing method of claim 8, wherein the fusion and tapering step for the second coupler further includes the substeps of
   determining when a maximum total transfer of the multimode optical signal from the pump fiber to the primary fiber is obtained during the fusion and tapering operations at the second portions based on the maximum multimode optical signal transfer obtained at the first portions and a maximum multimode optical signal transfer obtained at the second portions, and
   discontinuing the fusion and tapering operations at the second portions when it is determined that the maximum total multimode optical signal transfer is obtained.

10. The manufacturing method of claim 7, wherein the preparing first portions step includes the substeps of
    stripping the first portion of the primary fiber,
    stripping the first portion of the pump fiber, and
    twisting the primary and pump fibers together at the first stripped portions.

11. The manufacturing method of claim 10, wherein the fusion and tapering step for the first coupler further includes the substep of
    finalizing the first coupler formed by the fused and tapered fibers.

12. The manufacturing method of claim 7, wherein the preparing second portions step includes the substeps of
    stripping the second portion of the primary fiber,
    stripping the second portion of the pump fiber, and
    twisting the primary and pump fibers together at the second stripped portions.

13. The manufacturing method of claim 12, wherein the fusion and tapering step for the second coupler further includes the substep of
    finalizing the second coupler formed by the fused and tapered fibers.

14. An apparatus for manufacturing a twin coupler having first and second optical coupling means for coupling a pump fiber to a signal fiber, comprising:
    means for preparing first and second portions of both the signal fiber and the pump fiber for coupling; and
    means for performing fusion and stretching operations on the signal and pump fibers at the first and second portions, the fusion and stretching operations at the first portions forming the first coupling means, and the fusion and stretching operations at the second portions forming the second coupling means and being dependent upon the fusion and stretching operations performed at the first portions.

15. The apparatus of claim 14, further including multimode source means for supplying a multimode signal to the pump fiber; and means for determining when a maximum transfer of the multimode signal from the pump fiber to the signal fiber is obtained during the fusion and stretching operations at the first portions, and for discontinuing the fusion and stretching operations at the first portions when it is determined that the maximum multimode signal transfer is obtained.

16. The apparatus of claim 15, further including means for determining when a maximum total transfer of the multimode signal from the pump fiber to the signal fiber is obtained during the fusion and stretching operations at the second portions based on the maximum multimode signal transfer obtained at the first portions and a maximum multimode signal transfer obtained at the second portions, and for discontinuing the fusion and stretching operations at the second portions when it is determined that the maximum total multimode signal transfer is obtained.

17. The apparatus of claim 14, wherein the preparing means includes means for stripping the first portion of the signal fiber, means for stripping the first portion of the pump fiber, and means for twisting the signal and pump fibers together at the first stripped portions.

18. The apparatus of claim 14, wherein the preparing means includes means for stripping the second portion of the signal fiber, means for stripping the second portion of the pump fiber, and means for twisting the signal and pump fibers together at the second stripped portions.

19. An apparatus for manufacturing at least first and second optical couplers of a multiple coupler system for coupling a multimode pump fiber to a multimode signal fiber, comprising:

means for supplying a multimode optical signal to the pump fiber;

means for fusing the signal and pump fibers at first and second spaced locations;

means for tapering the signal and pump fibers at the first and second locations;

means for monitoring a coupling efficiency based on an amount of the multimode optical signal transferred from the pump fiber to the signal fiber at the first and second couplers; and means for controlling the fusing and tapering means to heat and stretch the signal and pump fibers at the first locations to produce the first coupler based on the monitored coupling efficiency for the first coupler, and for controlling the fusing and tapering means to heat and stretch the signal and pump fibers at the second locations to produce the second coupler based on the coupling efficiency for the first coupler and the monitored coupling efficiency for the second coupler.

20. A method for manufacturing at least first and second optical couplers of a multiple coupler system for coupling a multimode signal fiber and a multimode pump fiber, comprising the steps of:

supplying a multimode optical signal to the pump fiber;

heating and stretching first portions of the signal and pump fibers to produce the first coupler;

monitoring a coupling efficiency for the first coupler based on an amount of the multimode optical signal transferred from the pump fiber to the signal fiber at the first coupler;

controlling the first portions heating and stretching step to achieve a maximum value for the coupling efficiency for the first coupler;

heating and stretching second portions of the signal and pump fibers to produce, the second coupler;

monitoring a coupling efficiency for the second coupler based on an amount of the multimode optical signal transferred from the pump fiber to the signal fiber at the second coupler; and controlling the second portions heating and stretching step to achieve a maximum total coupling efficiency for the multiple coupler system based on the achieved maximum coupling efficiency for the first coupler and the coupling efficiency for the second coupler.

* * * * *